(12) United States Patent  
Yokoi et al.

(10) Patent No.: US 9,377,711 B2
(45) Date of Patent: Jun. 28, 2016

(54) DEVELOPING DEVICE, BLADE UNIT, AND DEVELOPING DEVICE MANUFACTURING METHOD

(71) Applicant: BROTHER KOGYO KABUSHIKI KAISHA, Nagoya-shi, Aichi-ken (JP)

(72) Inventors: Junichi Yokoi, Nagoya (JP); Hikaru Yoshizumi, Handa (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 14/230,755

(22) Filed: Mar. 31, 2014

(65) Prior Publication Data

US 2015/0093156 A1 Apr. 2, 2015

(30) Foreign Application Priority Data

Sep. 30, 2013 (JP) ................................. 2013-205680
Sep. 30, 2013 (JP) ................................. 2013-205712

(51) Int. Cl.
*G03G 15/08* (2006.01)
*B23K 26/22* (2006.01)
*B23K 26/20* (2014.01)

(52) U.S. Cl.
CPC ............ *G03G 15/0812* (2013.01); *B23K 26/20* (2013.01); *B23K 26/22* (2013.01); *B23K 26/244* (2015.10); *B23K 2203/04* (2013.01)

(58) Field of Classification Search
CPC .................................................. G03G 15/0812
See application file for complete search history.

(56) References Cited

U.S. PATENT DOCUMENTS

| 6,175,708 | B1 | 1/2001 | Ohashi et al. |
| 2001/0031158 | A1 | 10/2001 | Yokomori et al. |
| 2004/0120734 | A1 | 6/2004 | Okamoto |
| 2006/0024085 | A1 | 2/2006 | Sato et al. |
| 2008/0118280 | A1* | 5/2008 | Han et al. ...................... 399/284 |
| 2009/0188897 | A1* | 7/2009 | Margairaz et al. ............... 219/75 |
| 2012/0272611 | A1* | 11/2012 | Tsukimoto et al. .......... 52/741.1 |
| 2013/0170876 | A1 | 7/2013 | Brown et al. |
| 2013/0232749 | A1 | 9/2013 | Bruck et al. |

FOREIGN PATENT DOCUMENTS

| EP | 1394629 | A1 | 3/2004 | |
| GB | 2239205 | * | 6/1991 | ................... 219/91.2 |

(Continued)

OTHER PUBLICATIONS

Feb. 10, 2015—(US) Non-Final Office Action—U.S. Appl. No. 14/230,916.

(Continued)

*Primary Examiner* — Roy Y Yi
(74) *Attorney, Agent, or Firm* — Banner & Witcoff, Ltd.

(57) ABSTRACT

Aspects include an apparatus, a blade assembly, and a method for manufacturing the apparatus with the blade assembly. The apparatus may include a developer carrier for carrying developer and a blade assembly. The blade assembly may include a blade disposed adjacent to the developer carrier and configured to regulate an amount of developer on the developer carrier. The blade may include a plurality of weld marks joining the blade to the supporting member. Each of the plurality of weld marks may overlap with an adjacent one of the plurality of weld marks. Together the weld marks may form a combined weld mark that extends in a direction that the blade extends.

21 Claims, 12 Drawing Sheets

(56) References Cited

FOREIGN PATENT DOCUMENTS

| | | |
|---|---|---|
| GB | 2342881 A | 4/2000 |
| JP | 57-78574 A | 5/1982 |
| JP | 2001-356592 A | 12/2001 |
| JP | 2003145932 A | 5/2003 |
| JP | 2006-145932 A | 6/2006 |
| JP | 2006145932 A | 6/2006 |
| JP | 2008290083 A | 12/2008 |

OTHER PUBLICATIONS

Feb. 11, 2015—(US) Non-Final Office Action—U.S. Appl. No. 14/230,502.

European Search Report issued Mar. 20, 2015 in European Application No. 14186524.6.

Tritium: "Solar Panel Tig welding" Retrieved from the Internet: URL: http://weldingweb.com/showthread.php?57437?Solar?Panel?Tig?welding&p=523926#post523926 last visited on May 21, 2015.

European Search Report issued Feb. 18, 2015 for European Application No. 14186531.1.

Jun. 3, 2015—(US) Notice of Allowance—U.S. Appl. No. 14/230,502.

Jun. 5, 2015—(US) Notice of Allowance—U.S. Appl. No. 14/230,916.

Sep. 11, 2015—(US) Notice of Allowance—U.S. Appl. No. 14/230,502.

* cited by examiner

LONGER-DIRECTION

DEVELOPING DEVICE, BLADE UNIT, AND DEVELOPING DEVICE MANUFACTURING METHOD

CROSS-REFERENCE TO RELATED APPLICATION

This application claims priority from Japanese Patent Application No. 2013-205712, filed on Sep. 30, 2013, and Japanese Patent Application No. 2013-205680, filed on Sep. 30, 2013, which are incorporated herein by reference in their entirety.

TECHNICAL FIELD

Aspects disclosed herein relate to a blade unit in which a blade is joined to a supporting member by welding, a developing device using the blade unit, and a manufacturing method of the developing device.

BACKGROUND

Conventionally, there has been an electrophotographic image forming apparatus that includes a developing device including a developing roller and a blade unit for regulating a thickness of a developer layer held on the developing roller. Further, there has been known a blade unit that includes a blade that contacts the developing roller and a supporting member that holds the blade in an overlapping manner.

In the blade unit, the blade and the supporting member are welded to each other at a plurality of locations along the blade in an extended dimension of the blade. Therefore, the blade is formed with a plurality of weld marks spaced apart from each other.

SUMMARY

In some cases, each weld mark formed using the above-described technique might not have a fixing strength that is strong enough to support the blade, and therefore, the blade might not be fixed to the supporting member securely.

Accordingly, for example, aspects of the disclosure provide for a developing device, a blade assembly, and a developing device manufacturing method in which a blade may be securely fixed to a supporting member.

Aspects of the disclosure describe an apparatus comprising a developer carrier, a blade, and a supporting member. The blade may be disposed adjacent to the developer carrier. The supporting member may be configured to support the blade. Further, the blade may comprise a plurality of weld marks joining the blade to the supporting member. Each of the plurality of weld marks may overlap with an adjacent one of the plurality of weld marks. In some embodiments, at least one of the plurality of weld marks may have a circular shape. Also, the plurality of weld marks may from a combined weld mark such that a direction of a longest dimension of the blade is approximately parallel to a direction of a longest dimension of the combined weld mark.

Aspects of the disclosure also provide a blade assembly comprising a blade and a supporting member. The blade may be configured to regulate an amount of developer on a developer carrier, and the supporting member may be configured to support the blade. For example, the supporting member may be configured to support the blade in a position so that it may regulate an amount of developer on the developer carrier within a developing device. The blade of the blade assembly may also include a plurality of weld marks joining the blade to the supporting member, and each of the plurality of weld marks may overlap with an adjacent one of the plurality of weld marks.

Additional aspects of the disclosure include methods of manufacturing a developing device. For example, the disclosure describes a method including controlling a fiber laser to irradiate a first laser beam onto first portion of a blade to form a first weld mark welding the blade to a supporting member; and controlling the fiber laser to irradiate a second laser beam onto a second portion of the blade to form a second weld mark further welding the blade to the supporting member. The second portion may be different from the first portion and the second weld mark may overlap the first weld mark. The method may also include configuring an apparatus to implement the blade to regulate an amount of developer on a developer carrier.

In another example, a method of manufacturing a developing device may include forming, by a yttrium aluminum garnet (YAG) laser, a first weld mark at a first portion on a blade to weld the blade to a supporting member; and forming, by the YAG laser, a second weld mark at a second portion on the blade to weld the blade to the supporting member. The second portion may be different from the first portion and the second weld mark may overlap the first weld mark. The method may also include configuring an apparatus to implement the blade to regulate an amount of developer on a developer carrier.

According to the aspects of the disclosure, the blade may be fixed to the supporting member more securely as compared with a case where the weld marks do not overlap one another.

This summary is not intended to identify critical or essential features of the disclosure, but instead merely summarizes certain features and variations thereof. Other objects, features, and advantages will be apparent to persons of ordinary skill in the art from the following detailed description of the disclosure and the accompanying drawings.

DESCRIPTION OF THE DRAWINGS

Aspects of the disclosure are illustrated by way of example and not by limitation in the accompanying figures in which like reference characters indicate similar elements.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments of the disclosure will be described in detail with reference to the accompanying drawings. Additionally, U.S. Patent Application, entitled "Developing Device, Blade Unit, and Developing Device Manufacturing Method" and having 14/230,916 in the offices of Banner & Witcoff, Ltd., is hereby incorporated by reference herein in its entirety.

Figure 1:
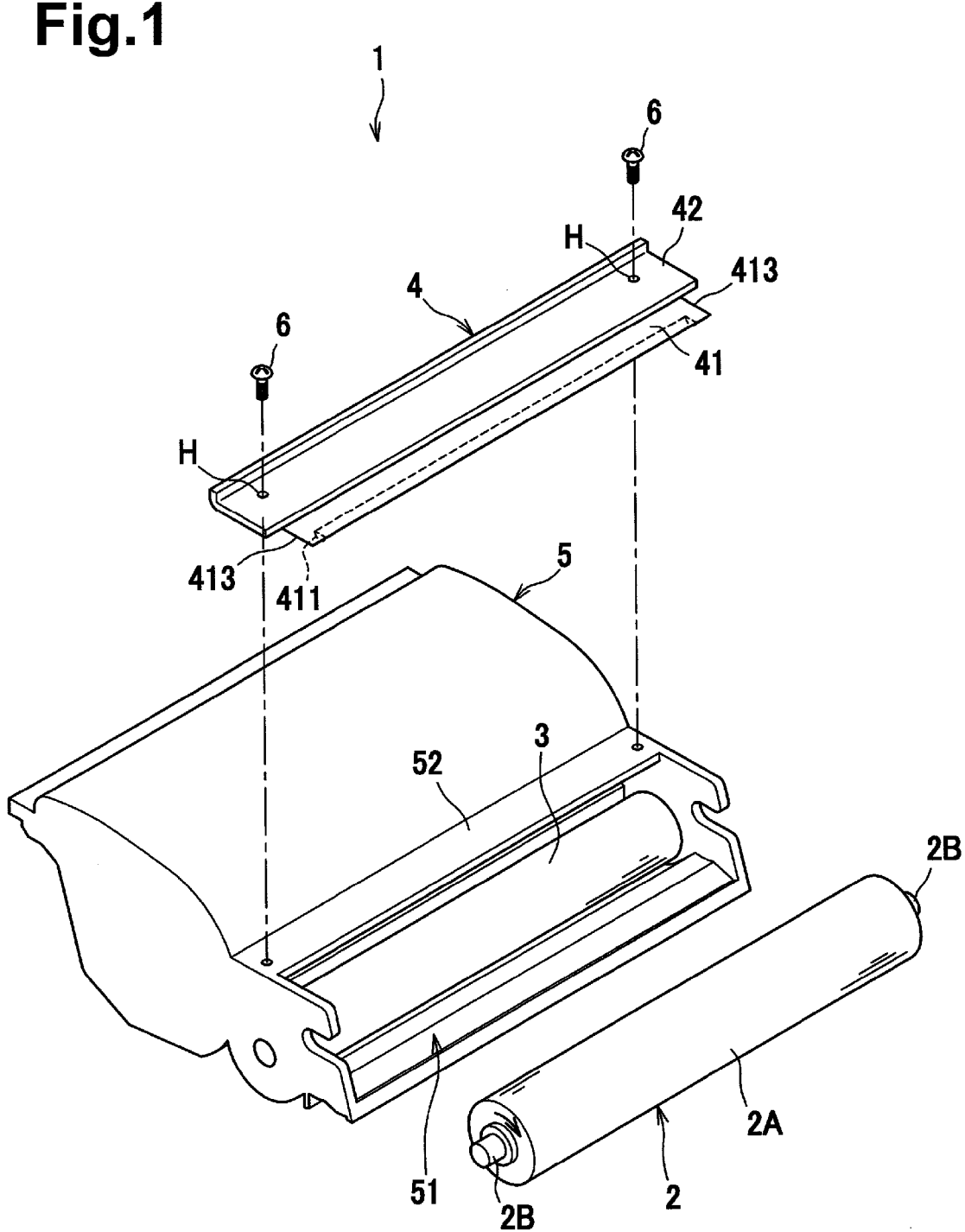
FIG. 1 is a disassembled perspective view depicting a developing device in an illustrative embodiment according to one or more aspects of the disclosure.

As depicted in FIG. 1, a developing device 1 may comprise a developing roller 2 (an example of a developer carrier), a supply roller 3, a blade assembly 4 (or blade unit), and a developing case 5 that may hold these components.

The developing case 5 may be a container having therein a toner storage chamber 53 capable of storing toner therein. The developing case 5 may also be formed to define an opening 51 in one of its surfaces. The developing case 5 may define an edge of the opening 51 and comprise a blade support surface 52 to which the blade unit 4 may be fixed.

Figure 2:
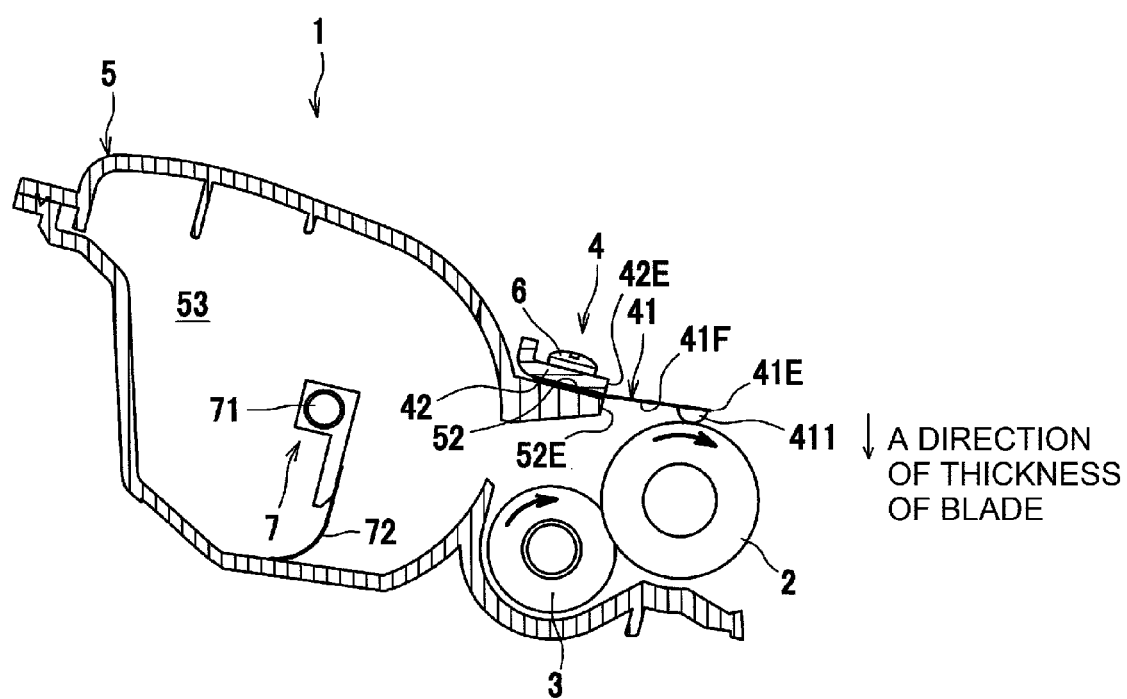
FIG. 2 is a sectional view depicting the developing device in the illustrative embodiment according to one or more aspects of the disclosure.

As depicted in FIG. 2, a conveyor member 7 for conveying toner toward the supply roller 3 may be disposed in the toner storage chamber 53. The conveyor member 7 may comprise a shaft portion 71 that may be rotatably supported by the developing case 5, and a film 72 (or other agitator) that may rotate along with rotation of the shaft portion 71.

As depicted in FIG. 1, the developing roller 2 may comprise a cylindrical roller body 2A and a shaft 2B that may be inserted into the roller body 2A and may rotatably interface with the roller body 2A. The roller body 2A may have elasticity and may be capable of holding toner on its cylindrical surface. The developing roller 2 may be disposed to close or partially close the opening 51 of the developing case 5. The shaft 2B may protrude from the roller body 2A in an axial direction of the developing roller 2 and may be rotatably supported by the developing case 5.

The supply roller 3 may be disposed inside the developing case 5 in contact with the developing roller 2, and may be rotatably supported by the developing case 5. The supply roller 3 may be configured to supply toner stored in the developing case 5 to the developing roller 2 as the developing roller 2 rotates.

The blade assembly 4 (or blade unit) may comprise a blade 41 and a supporting member 42 (an example of a supporter). The blade 41 may be disposed near the developing roller 2 such that a tip of the blade 41 may be placed on the developing roller 2. The supporting member 42 may hold the blade 41.

The blade 41 may comprise sheet metal having an approximately rectangular shape (e.g., sheet metal having two longer sides and two shorter sides). The blade 41 may be positioned so that a longer side of the blade extends in a direction that an axis of the developing roller 2 may extend (hereinafter, this direction may be referred to as the longer direction LD (see FIG. 3A)). That is, a longer side of the blade 41 may be approximately parallel to the axial direction of the developing roller 2, and a shorter side of the blade 41 may be approximately perpendicular to the axial direction of the developing roller 2 (hereinafter, this approximately perpendicular direction may be referred to as the shorter direction SD (see FIG. 3A)). The blade 41 may be made of metallic material, for example, stainless steel. In other embodiments, for example, the blade 41 may comprise a sheet metal whose surface may have a coating including press oil.

For example, the blade 41 may have a thickness of 0.05 to 2.5 mm, a thickness of 0.05 to 0.12 mm, a thickness of 0.05 to 1.00 mm, a thickness of 0.07 to 0.15 mm, or a thickness of 0.08 to 0.12 mm. A longer dimension (e.g., a length) of the blade 41 (extending in the longer direction) may be greater than a dimension of the roller body 2A of the developing roller 2 in the axial direction. For example, the blade 41 may have a length of 218 to 270 mm, a length of 220 to 260 mm, or a length of 222 to 250 mm.

The blade 41 may comprise a contact portion 411, which may protrude toward the developing roller 2 and directly contact the roller body 2A of the developing roller 2. The contact portion 411 may protrude from a distal end 41E of a lower surface 41F (e.g., a surface facing the developing roller 2) of the blade 41 (see FIG. 2). The contact portion 411 may be made of, for example, rubber and may extend in the longer direction of the blade 41.

The supporting member 42 may be a member for fixing or otherwise holding a fixed end of the blade 41 to the developing case 5.

The supporting member 42 may be made of metallic material, for example, electrolytic zinc-coated carbon steel sheet. The supporting member 42 may have a thickness greater than the blade 41 and an approximately or substantially rectangular shape. A longer side of the supporting member 42 may be positioned so that it extends in a direction that is approximately parallel to the longer side of the blade 41. The supporting member 42 may extend so as to exceed both ends 413 of the blade 41. That is, the longer side of the supporting member 42 may be longer than the longer side of the blade 41.

The ends of the supporting member 42 may extend past the ends of the blade 41. The supporting member 42 may extend over the blade 41 on a side opposite to the blade support surface 52 so that the supporting member 42 may pinch the blade 41 in conjunction with the blade support surface 52 of the developing case 5. In other words, the supporting member 42 and blade support surface 52 may be positioned such that the blade 41 is interposed therebetween. The blade 41 may be pinched between an edge 42E of the supporting member 42 and an edge 52E of the support surface 52. A portion, which may contact the edge 42E of the supporting member 42 and the edge 52E of the blade support surface 52, of the blade 41 may function as a fulcrum when the blade 41 bends.

The blade unit 4 configured as described above may be fixed to the developing case 5 using screws 6 through holes H in the blade 41 and the supporting member 42. In this state, the blade unit 4 may be configured to regulate a thickness of a toner layer attaching to the developing roller 2. In particular, the contact portion 411 of the blade 41, which may contact the rotating developing roller 2, may regulate a thickness of the toner layer by blocking excess toner from passing as the developing roller 2 rotates.

Figure 3A:
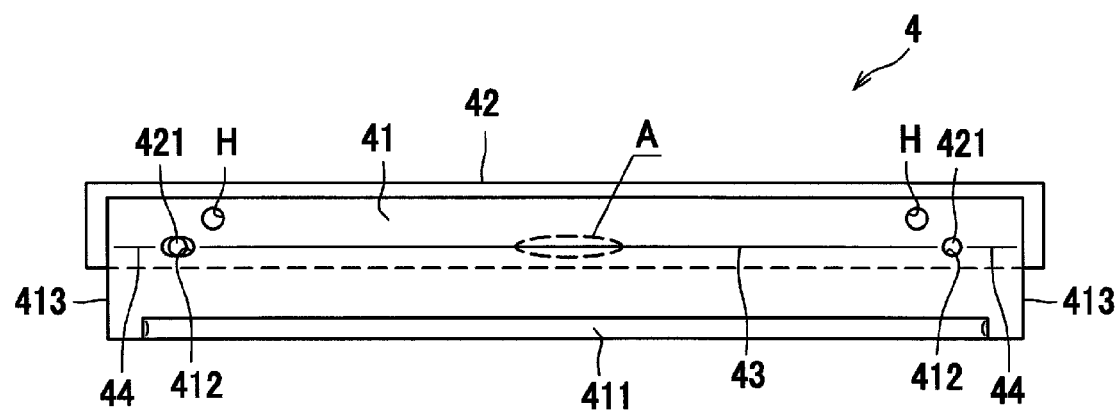
FIG. 3A illustrates a blade unit according to one or more aspects of the disclosure.

As depicted in FIG. 3A, the supporting member 42 may comprise a positioning protrusion 421, which may be engaged with the blade 41, e.g., at opposite ends of the long side of the blade 41. The positioning protrusion 421 may protrude from a surface of the supporting member 42 that faces the blade 41. As shown in the example embodiment of FIG. 3A, the blade 41 may have a pair of openings 412 that may be engaged with a pair of positioning protrusions 421. One of the pair of openings 412 may be a circular opening and the other of the pair of openings 412 may be an elongated opening. The elongated opening of the pair of openings 412 may absorb a dimensional deviation between the two openings 412 and linear expansion of the blade 41 and/or the supporting member 42 in the longer direction that may occur during welding. In other words, for example, the elongated opening 412 may be elongated in order for the blade 41 to stay engaged with one of the positioning protrusions 421 if the blade 41 expands as a result of welding. The blade 41 may be positioned with respect to the supporting member 42 by the engagement of the openings 412 and the corresponding positioning protrusions 421, respectively.

The blade 41 may be welded to the supporting member 42 at a plurality of locations along the blade 41 in the longer direction. More specifically, the blade 41 may be joined to the supporting member 42 by laser welding at multiple portions of the blade 41, including portions of the blade 41 between the positioning protrusions 421 and ends 413 of the blade 41 and portions of the blade 41 between the positioning protrusions 421 themselves.

The blade 41 may have a first combined weld mark 43, which may join the blade 41 and the supporting member 42 at a position between the positioning protrusions 421, and second combined weld marks 44, which may join the blade 41 and the supporting member 42 at respective positions located towards an outer edge of the supporting member 42 from the respective positioning protrusions 421 in the longer direction.

The first combined weld mark 43 may extend from a vicinity of one of the openings 412 to a vicinity of the other of the openings 412 along the longer dimension of the blade 41.

Figure 3B:
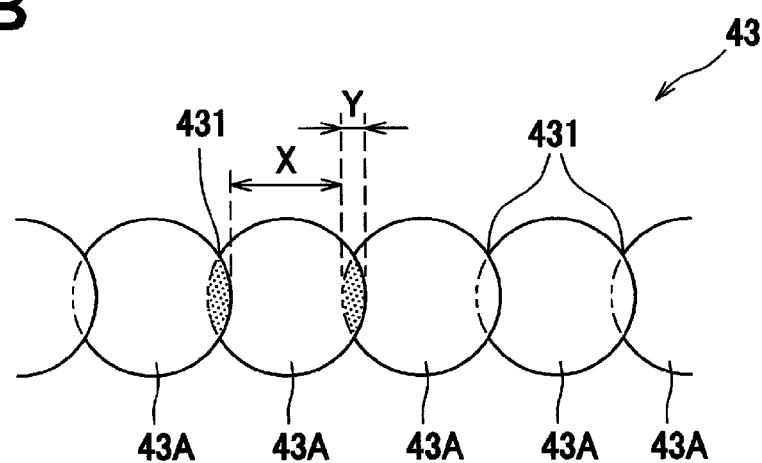
FIG. 3B is an enlarged view of a portion A of FIG. 3A according to one or more aspects of the disclosure.

As depicted in FIG. 3B, the first combined weld mark 43 may include a plurality of weld marks 43A that may be aligned along the longer direction of the blade 41, wherein adjacent weld marks of the plurality weld marks 43A may overlap each other. That is, the plurality of weld marks 43A that the blade 41 may have may partially overlap one another, thereby forming the large weld mark 43. A weld mark may refer to a welded portion (e.g., a modified portion of the blade and/or supporting member) that may be formed by one continuous application (e.g., one pulse) of a laser beam.

Each weld mark 43A may have a shape and size corresponding to the shape and size (e.g., diameter) of the laser beam used to create the weld mark. The circular shape, as shown in the example of FIG. 3B, may include a circular shape in which a dimension of a most elongated portion (e.g., longest diameter) may be within a range of 110% to 330% of a dimension of a least elongated portion (e.g. shortest diameter). In other embodiments, for example, the dimension of the most elongated portion (e.g., longest diameter) may be within a range of 110% to 250%, a range of 100% to 120%, a range of 100% to 110%, a range of 101% to 105%, or a range of 101% to 115% of the dimension of the least elongated portion (e.g. shortest diameter). For example, the weld marks 43A may have a size of 0.1 to 6.0 mm. In other embodiments, the weld marks 43A may have a size of 0.3 to 4.0 mm or a size of 0.5 to 2.0 mm.

The plurality of weld marks 43A may overlap on top of one another in an order in which the plurality of weld marks 43A may be arranged in the longer direction of the blade 41. For example, when creation of the weld marks 43A begins from the circular opening 412 side of the blade, a weld marks 43A formed further from the circular opening 412 may be formed over the adjacent weld mark 43A formed closer to the circular opening 412 (see dotted lines illustrated in FIG. 3B). Adjacent ones of the plurality of weld marks 43A may partially overlap each other. In one weld mark 43A, a total area of overlapping regions (e.g., hatched or shaded regions) where the one weld mark 43A may overlap other weld marks 43A may be smaller than an area of a non-overlapping region where the one weld mark 43A might not overlap the other weld marks 43A.

In the plurality of weld marks 43A overlapping one another as described above, an interval X between weld marks 43A formed on both sides of one weld mark 43A may be greater than a width Y of an overlapping region of the one weld mark 43A and one of the adjacent weld marks 43A.

In the first combined weld mark 43, including the plurality of weld marks 43A, a dimension of the first combined weld mark 43 in the longer direction of the blade 41 may be greater than a dimension of the first combined weld mark 43 in the shorter direction of the blade 41. The first combined weld mark 43 may have necking portions 431 (where outer edges of neighboring weld marks 43A meet) at a plurality of locations in the longer direction of the blade 41. For example, the first combined weld mark 43 may have a dimension of 0.1 to 250 mm in a direction that the plurality of weld marks 43A may be arranged, that is, in the longer direction, and a dimension of 0.1 to 6.0 mm in the shorter direction. In other embodiments, for example, the first combined weld mark 43 may have a dimension of 0.3 to 4.0 mm or a dimension of 0.5 to 2.0 mm in the shorter direction.

As depicted in FIG. 3A, the second combined weld marks 44 may continue from respective vicinities of the openings 412 to respective vicinities of the ends 413 of the blade 41 along the longer direction of the blade 41.

In a similar manner to the first combined weld mark 43 depicted in FIG. 3B, each second combined weld mark 44 may include a plurality of circular weld marks 43A that may be arranged along the longer direction of the blade 41, and that may overlap with one another (as depicted in FIG. 3B).

Hereinafter, advantages of the blade unit 4, configured in accordance with this disclosure, are described.

The first combined weld mark 43 and the second combined weld mark 44 formed on the blade 41 each may consist of the plurality of weld marks 43A overlapping one another. Therefore, the blade 41 may be fixed to the supporting member 42 more securely as compared with a configuration in which weld marks might not overlap one another.

The plurality of weld marks 43A may be arranged along the longer direction of the blade 41, and each of the first combined weld mark 43 and the second combined weld marks 44 may continue along the longer direction of the blade 41. Therefore, this configuration may reduce a risk of applying a strong force to a particular portion of the blade 41 when the blade 41 is in contact with the developing roller 2.

Next, a manufacturing method of the developing device 1 is described.

Figure 4A:
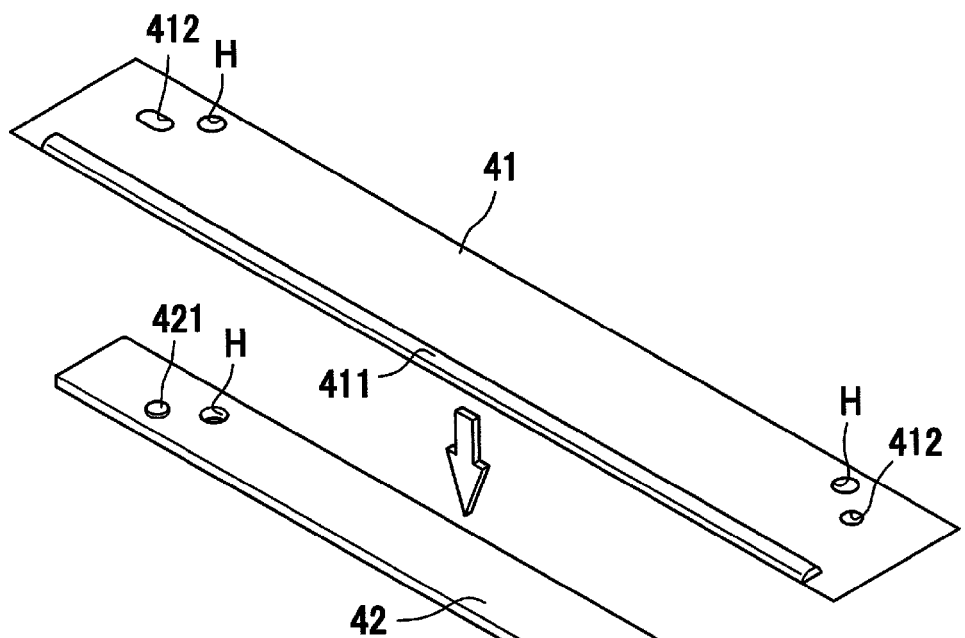
FIG. 4A is a diagram for explaining a preparation process in a developing device manufacturing method according to one or more aspects of the disclosure.

When the blade unit 4 is assembled, as depicted in FIG. 4A, the blade 41 may first be placed on the supporting member 42 (e.g., a preparation process). At that time, the openings 412 in the blade 41 may be engaged with the corresponding positioning protrusions 421 of the supporting member 42.

Figure 4B:
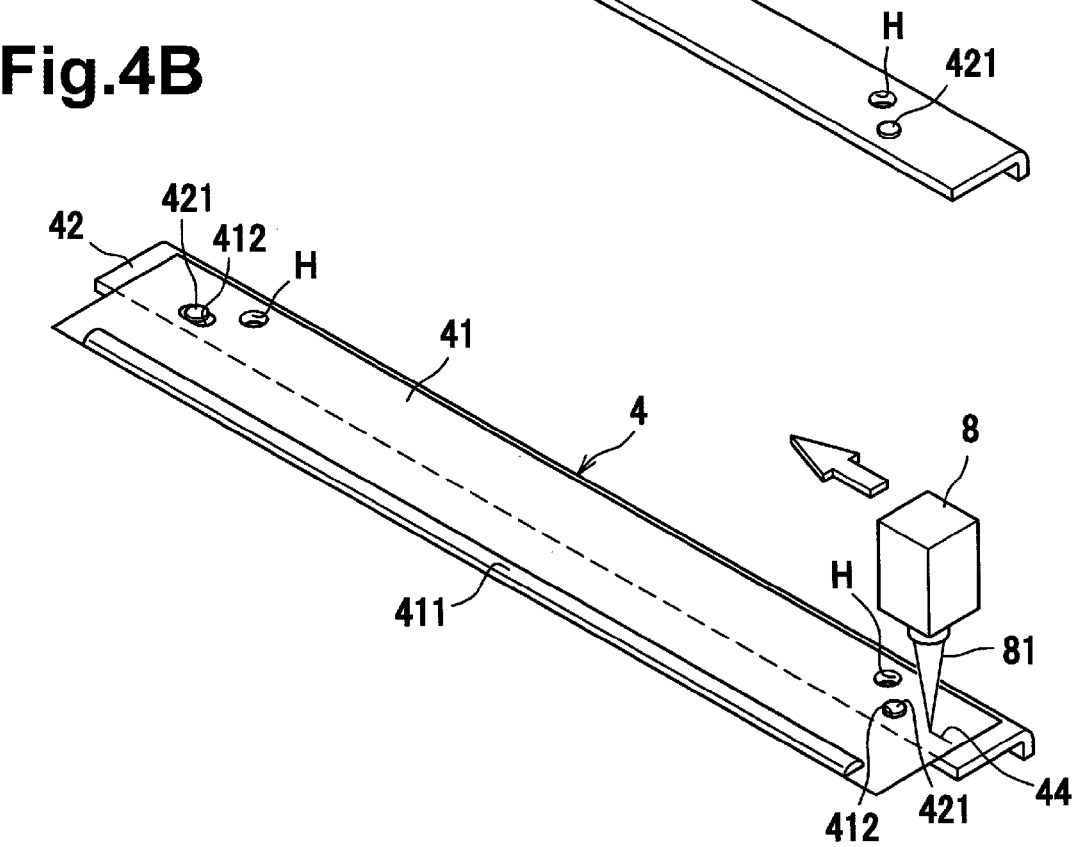
FIG. 4B is a diagram for explaining a welding process in the developing device manufacturing method according to one or more aspects of the disclosure.

Then, the blade 41 and the supporting member 42 may be fastened on a worktable. Thereafter, as depicted in FIG. 4B, while a laser beam 81 irradiated from the welding machine 8 is moved with respect to the blade 41, the laser beam 81 may be irradiated onto the blade 41 to weld the blade 41 and the supporting member 42 to each other (e.g., a welding process).

In some embodiments, the welding machine 8 may be configured to irradiate a portion, which may face the welding machine 8, of an object with a pulsed laser. That is, pulses of the laser beam 81 may be emitted. In other embodiments, for example, another welding machine that may be configured to irradiate the blade 41 with a laser beam by moving a reflector provided inside the welding machine, without moving the welding machine itself, may be used. For example, an yttrium aluminum garnet ("YAG") laser or a fiber laser may be implemented as the pulsed laser. In particular, a fiber laser (which emits a laser beam with a relatively small diameter) may be used so that the welding process for creating overlapping weld marks does not cause overheating and/or deformation of the blade 41 and/or the supporting member 42.

In the welding process, the laser beam 81 may be moved with respect to the blade 41 along the longer direction of the blade 41 from one end portion, in which the circular opening 412 may be defined, to the other end portion, in which the elongated opening 412 may be defined. Then, the laser beam 81 may be irradiated onto portions between the ends of the blade 41 and the edges of the openings 412, without contacting the ends of the blade 41 and edges of the openings 412.

Starting the welding from the circular opening 412 side as described above may allow the elongated opening 412 to absorb a thermal expansion of the blade 41 that may occur during welding.

The laser beam 81 may be moved with respect to the blade 41 at a speed which may allow formation of adjacent weld marks 43A that may overlap each other. In particular, the speed may be set such that an area of overlapping regions where one weld mark 43A may overlap other weld marks 43B may be smaller than an area of a non-overlapping region where the one weld mark 43A might not overlap the other weld marks 43A.

Figure 5:
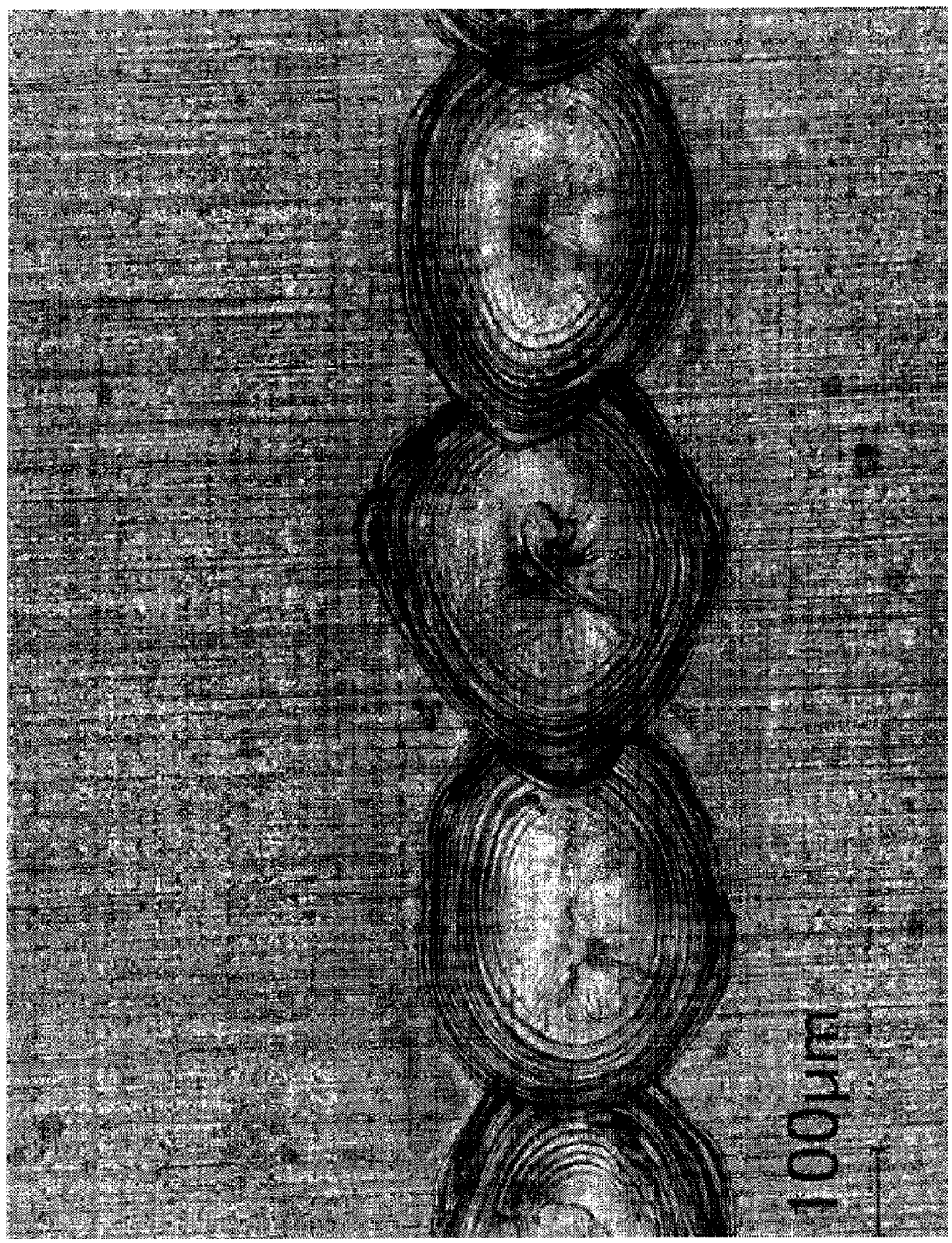
FIG. 5 illustrates a laser microscope image of an example weld mark formed on a blade as a result of the welding process performed according to one or more aspects of the disclosure.

As an example, FIG. 5 illustrates a weld mark formed by the welding process using a fiber laser welding machine ML-6700A (manufactured by MIYACHI CORPORATION) to weld a blade 41 made of stainless steel (e.g., a thickness of 0.1 mm) to a supporting member 42 made of electrolytic zinc-coated carbon steel sheet (e.g., a thickness of 1.2 mm). In the welding process, a pulsed laser was used as a laser beam, and the laser beam was moved at a speed of 200 mm/sec with respect to the blade 41, where a spot diameter of the laser beam was 0.2 mm, a pulse width of the laser beam was 1.0 msec, and power of the laser beam was 400 W. The weld mark of FIG. 5 was observed using the VK-X200 series laser microscope (manufactured by KEYENCE CORPORATION).

While the disclosure has been described in detail with reference to the example drawings, it is not limited to such examples. Various changes, arrangements, and modifications may be realized without departing from the spirit and scope of the disclosure. In the description below, common parts have the same reference numerals as those of the above-described embodiments, and the detailed description of the common parts is omitted.

Figure 6A:
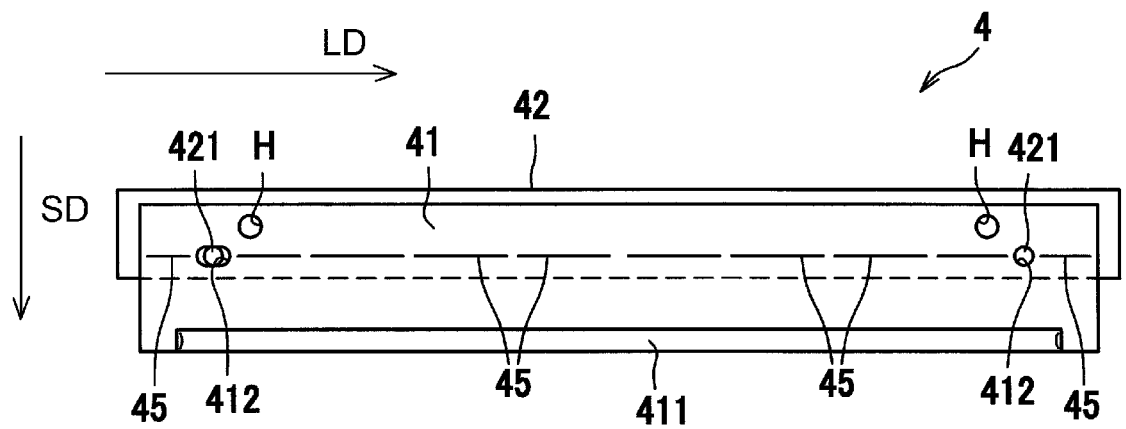
FIG. 6A illustrates a blade unit in a first variation according to one or more aspects of the disclosure.
Figure 6B:
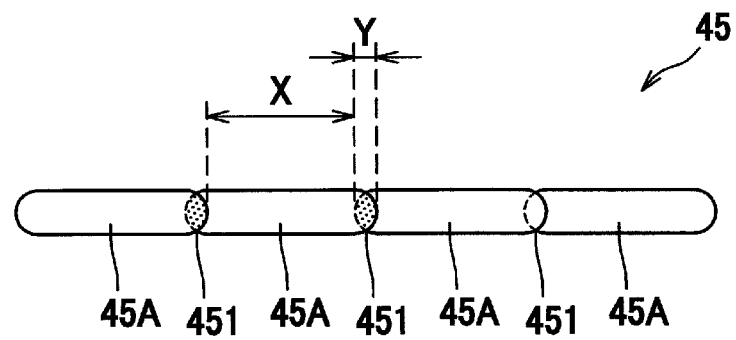
FIG. 6B is an enlarged view of weld marks in the first variation according to one or more aspects of the disclosure.

As described above, the blade 41 and the supporting member 42 may be joined to each other by welding using a pulsed laser, such as a YAG laser, and the circular weld marks 43A may be formed on the blade 41. However, the welding method of the blade 41 and the supporting member 42 might not be limited to that example. In other embodiments, for example, as depicted in FIGS. 6A and 6B, the blade 41 and the supporting member 42 may be joined to each other by welding using, for example, a continuous wave laser such as a fiber laser, and weld marks 45A each having a greater dimension in the longer direction of the blade 41 than a dimension in the shorter direction of the blade 41 may be formed on the blade 41.

More specifically, the blade 41 may be formed with a combined weld mark 45 comprising a plurality of weld marks 45A that may be disposed at a plurality of locations and arranged along the longer direction. Moreover, the plurality of weld marks 45A may partially overlap with one another. One weld mark 45A may overlap an adjacent weld mark 45A, and the combined weld mark 45 may have a plurality of necking portions 451 at a plurality of locations in the longer direction of the blade 41.

An interval X between weld marks 45A formed on both sides of one weld mark 45A may be greater than a width Y of an overlapping region of the one weld mark 45A and one of the adjacent weld marks 45A. In one weld mark 45A, an area of overlapping regions (e.g., hatched regions) where the one weld mark 45A may overlap other weld marks 45A may be smaller than an area of a non-overlapping region where the one weld mark 45A might not overlap the other weld marks 45A.

Figure 7:
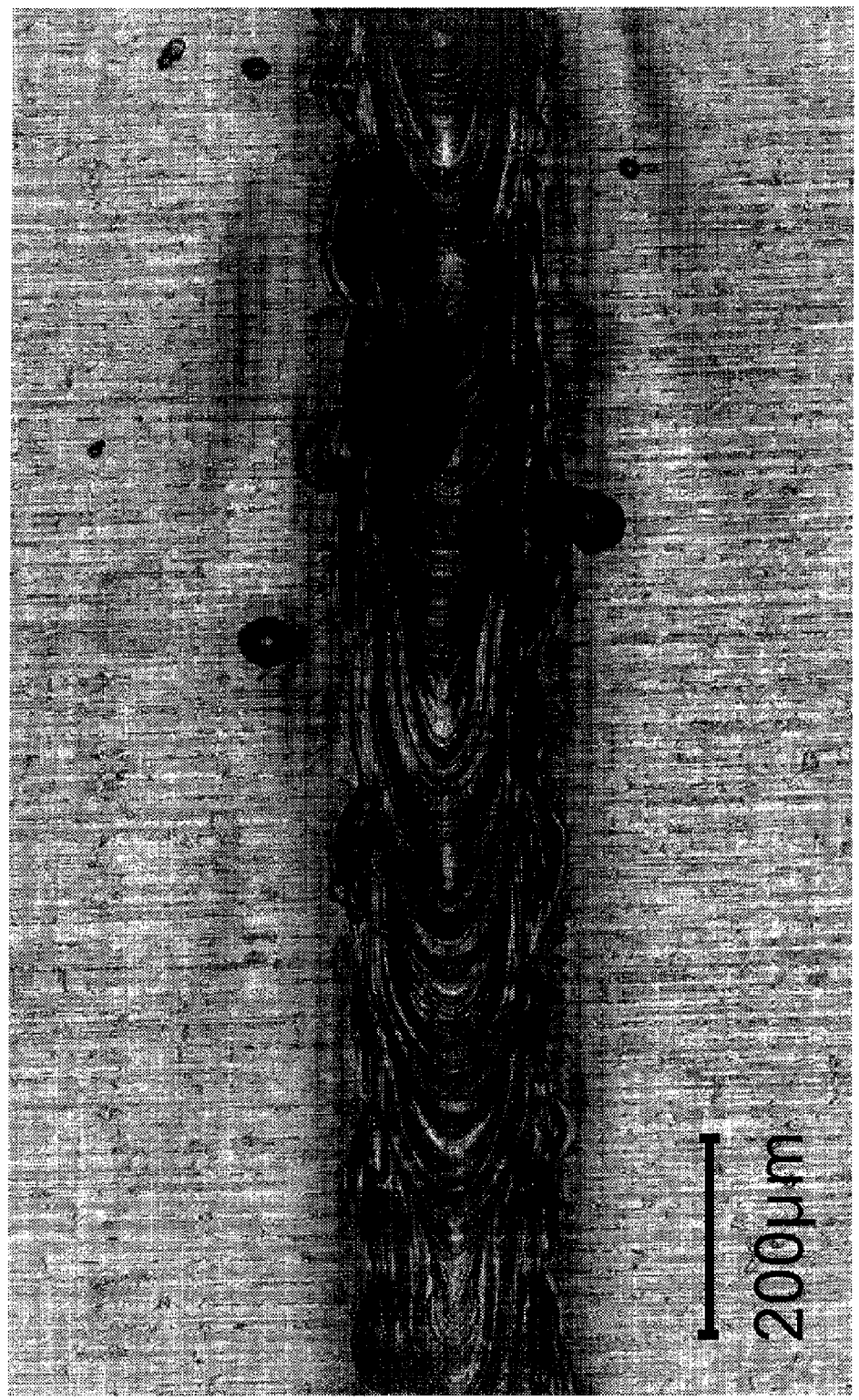
FIG. 7 illustrates a laser microscope image of an example weld mark formed on the blade in the first variation according to one or more aspects of the disclosure.

As an example, FIG. 7 illustrates a weld mark formed on a blade as a result of welding in which a laser beam such as a pulsed laser was moved at a speed of 200 mm/sec with respect to the blade, where a spot diameter of the laser beam was 0.1 mm, a pulse width of the laser beam was 0.35 msec, and power of the laser beam was 400 W. The welding machine, the blade, and the supporting member used to form the weld mark depicted in FIG. 7 may be the same as those used to form the weld mark depicted in FIG. 5.

Figure 6C:
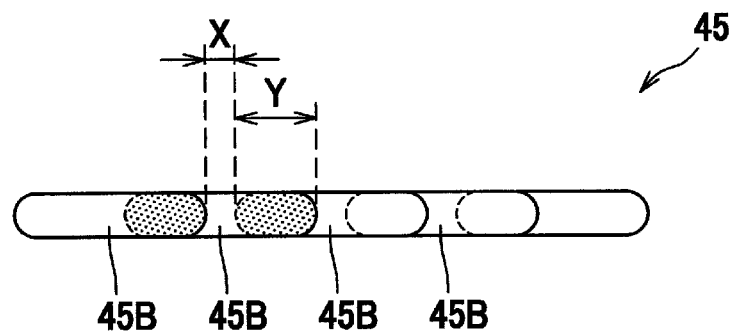
FIG. 6C is an enlarged view of weld marks in a second variation according to one or more aspects of the disclosure.

As depicted in FIG. 6C, the combined weld mark 45 may include a plurality of weld marks 45B that may overlap one another such that a total area of overlapping regions (e.g., hatched regions) where one weld mark 45B may overlap other weld marks 45B may be larger than an area of a non-overlapping region where the one weld mark 45B might not overlap the other weld marks 45B. In this case, an interval X of weld marks 45B formed on both sides of the one weld mark 45B may be narrower than a width Y of the overlapping region of the one weld mark 45B and one of the adjacent weld marks 45B.

To form such a combined weld mark 45, in the welding process, during intervals between irradiations of the laser beam 81, the laser beam 81 may be moved backwards so that it may begin to create subsequent weld marks 45 at a position within the most recently formed weld mark 45.

Figure 8A:
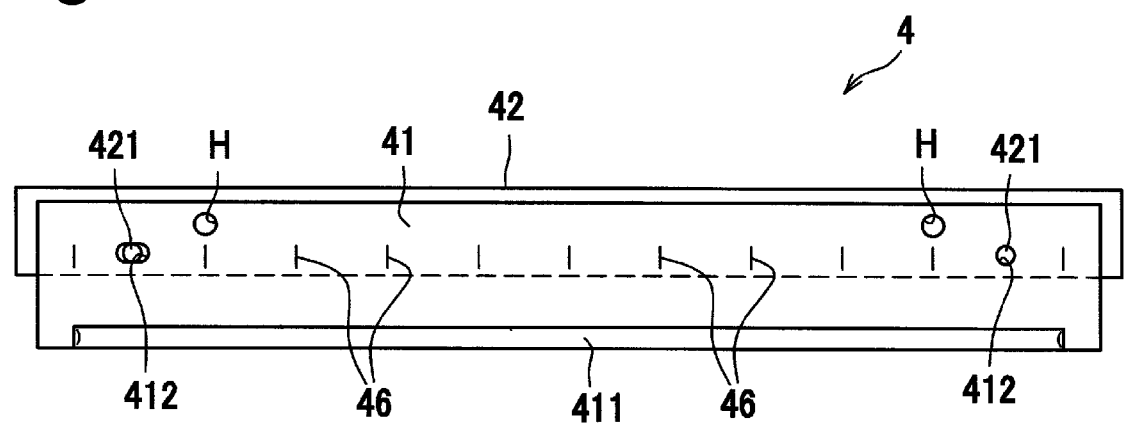
FIG. 8A illustrates a blade unit in a third variation according to one or more aspects of the disclosure.
Figure 8B:
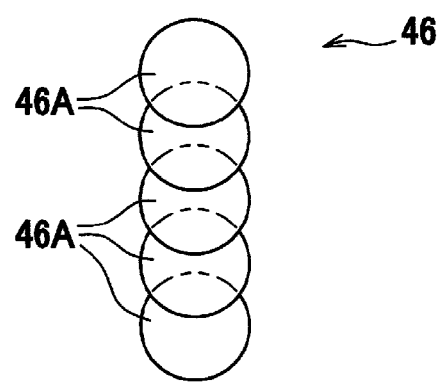
FIG. 8B is an enlarged view of weld marks in the third variation according to one or more aspects of the disclosure.

As described above, the plurality of weld marks 43A constituting each of the first combined weld mark 43 and the second combined weld marks 44 (e.g., combined weld marks) may be arranged along the longer direction of the blade 41. However, the direction that the plurality of weld marks may be arranged might not be limited to that example. In other embodiments, for example, as depicted in FIGS. 8A and 8B, a plurality of weld marks 46A constituting each combined weld mark 46 may be arranged along the shorter direction of the blade 41.

In this case, each combined weld mark 46 may have a shape in which its dimension in the shorter direction of the blade 41 is longer than its dimension in the longer direction of the blade 41.

The combined weld marks 46 may be formed at a plurality of locations, respectively, in the longer direction of the blade 41. It may be preferable that ends, which may be located closer to the contact portion 411, of the plurality of combined weld marks 46 are arranged in a straight line extending parallel to a direction that the contact portion 411 may extend such that a force applied to the developing roller 2 by the contact portion 411 is uniform.

Figure 9:
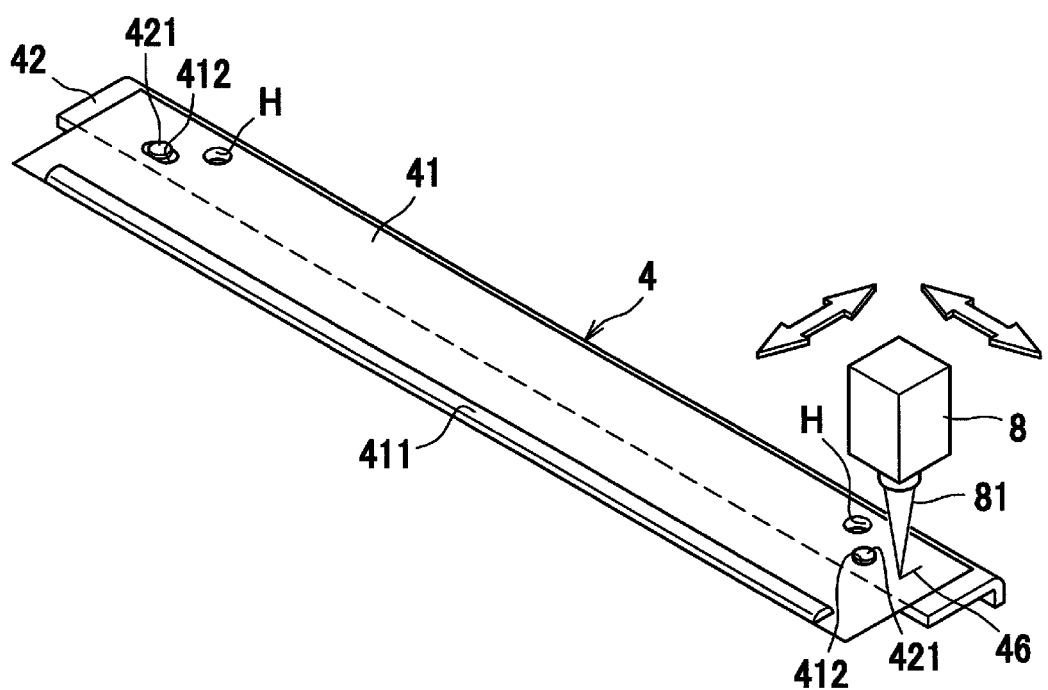
FIG. 9 is a diagram for explaining an assembling method of a blade unit in the third variation according to one or more aspects of the disclosure.

To form such a combined weld mark 46, in the welding process, as depicted in FIG. 9, a process of moving the laser beam 81 along the shorter direction of the blade 41 with respect to the blade 41 and a process of moving the laser beam 81 along the longer direction of the blade 41 with respect to the blade 41 may be alternately repeated.

In other embodiments, for example, a process of moving the laser beam 81 along the shorter direction of the blade 41 with respect to the blade 41 and a process of moving the laser beam 81 along the longer direction of the blade 41 with respect to the blade 41 may be repeatedly performed simultaneously.

Figure 10A:
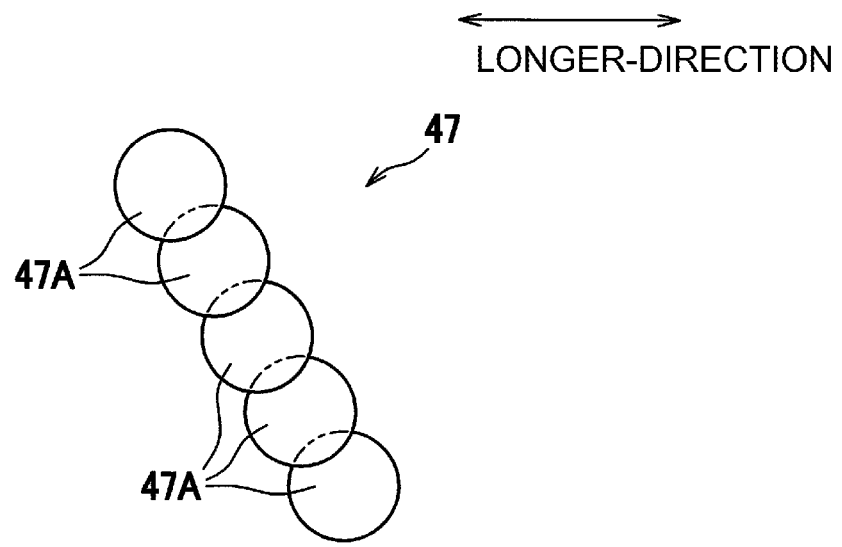
FIG. 10A is an enlarged view of weld marks in a fourth variation according to one or more aspects of the disclosure.
Figure 10B:
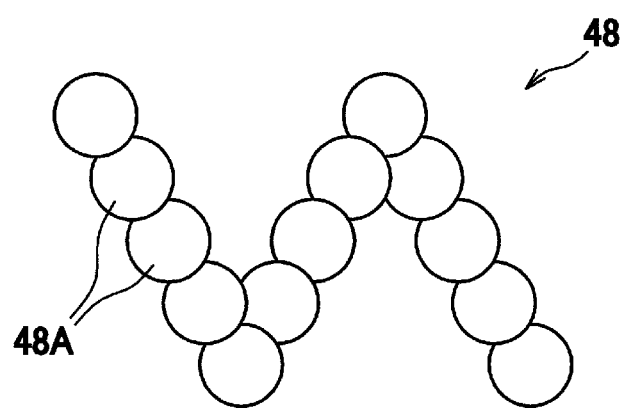
FIG. 10B is an enlarged view of weld marks in a fifth variation according to one or more aspects of the disclosure.

In this case, as depicted in FIG. 10A, a plurality of weld marks 47A may be arranged along a direction at an angle to the longer direction of the blade 41 and thus a combined weld mark 47 may extend along a direction at an angle with respect to the longer direction of the blade 41. For another example, as depicted in FIG. 10B, a plurality of weld marks 48A may be arranged along two directions each of which may be at an angle to the longer direction of the blade 41 and thus a combined weld mark 48 may have a zigzag shape.

Figure 11:
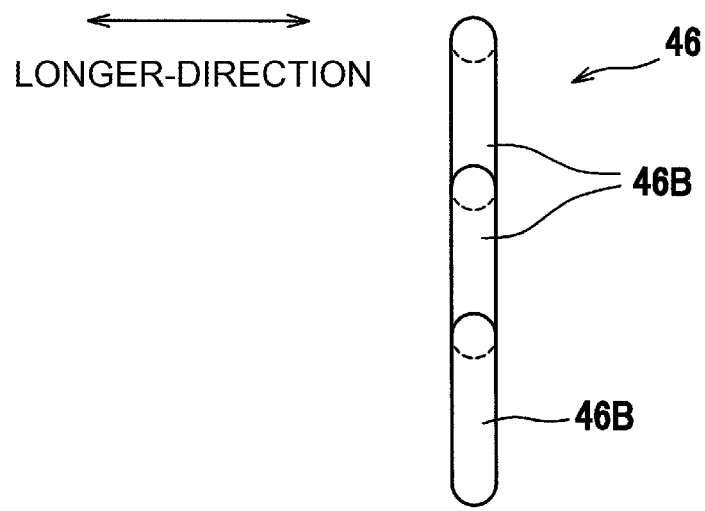
FIG. 11 is an enlarged view of weld marks in a sixth variation according to one or more aspects of the disclosure.

For example, as depicted in FIG. 11, the above-described combined weld mark 46 may include a plurality of weld marks 46B whose dimension in the shorter direction of the blade 41 may be longer than their dimension in the longer direction of the blade 41. The plurality of weld marks 46B may be arranged along the shorter direction of the blade 41.

Figure 12:
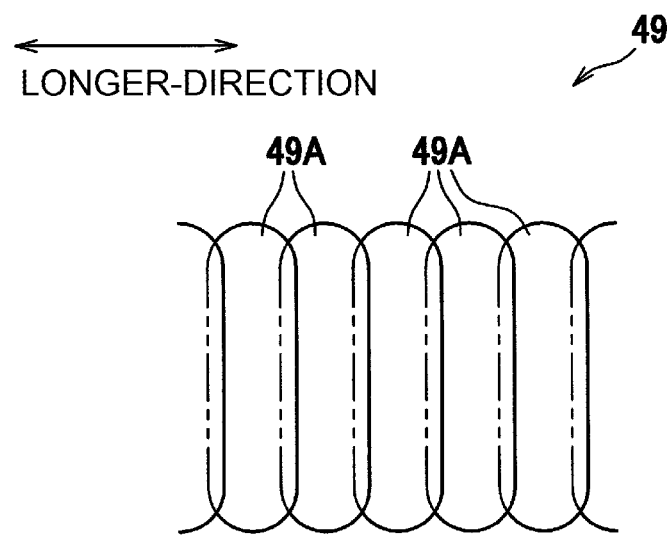
FIG. 12 is an enlarged view of weld marks in a seventh variation according to one or more aspects of the disclosure.

As described above, the circular weld marks 43A may be arranged along the longer direction of the blade 41 to constitute the first combined weld mark 43 (e.g., the large weld mark). However, in other embodiments, for example, as depicted in FIG. 12, a combined weld mark 49 may include a plurality of weld marks 49A that may be arranged along the longer direction of the blade 31 and whose dimension in the shorter direction of the blade 41 may be longer than their dimension in the longer direction of the blade 41.

As described above, the plurality of weld marks 43A may overlap on top of one another in an order in which the plurality of weld marks 43A may be arranged in the longer direction of the blade 41 from the circular opening 412 side. However, the overlapping manner of the weld marks 43A might not be limited to that example. For example, two weld marks may be formed at respective positions distant from each other, and then, another weld mark may be formed between the two distant weld marks so as to overlap each of the distant weld marks, whereby adjacent ones of all the weld marks may overlap each other.

As described above, the combined weld marks (e.g., the first combined weld mark 43 and the second combined weld marks 44) may be formed at one location in the shorter direction of the blade 41. However, the number of locations where the combined weld marks may be formed might not be limited to that example. In other embodiments, for example, two or more combined weld marks may be formed at respective positions in the shorter direction of the blade 41. In other words, multiple rows (spaced apart in the shorter direction and extending in the longer direction) of combined weld marks may be formed.

As described above, each of the combined weld marks (e.g., the first combined weld mark 43 and the second combined weld marks 44) may comprise a plurality of weld marks 43A. However, the configuration of the combined weld marks formed on the blade 41 might not be limited to that example. In other embodiments, for example, the second combined weld mark 44 may consist of a single weld mark elongated along the longer direction of the blade 41. That is, there may be one long weld mark instead of the plurality of weld marks 43A.

As described above, the blade 41 may be welded to the supporting member 42 at the plurality of locations. However, the method of welding the blade 41 might not be limited to that example. In other embodiments, for example, the blade 41 might only have the first combined weld mark 43, and thus, be joined to the supporting member 42 at only one location.

As described above, in the welding process, the laser beam 81 may be moved with respect to the blade 41. However, the manner of moving the laser beam 81 with respect to the blade 41 might not be limited to that example. In other embodiments, for example, the blade 41 and the supporting member 42 may be moved with respect to the laser beam 81 and the laser beam 81 may be stationary.

In still other embodiments, the laser beam 81 and the set of the blade 41 and the supporting member 42 may be moved at the same time.

Figure 13:
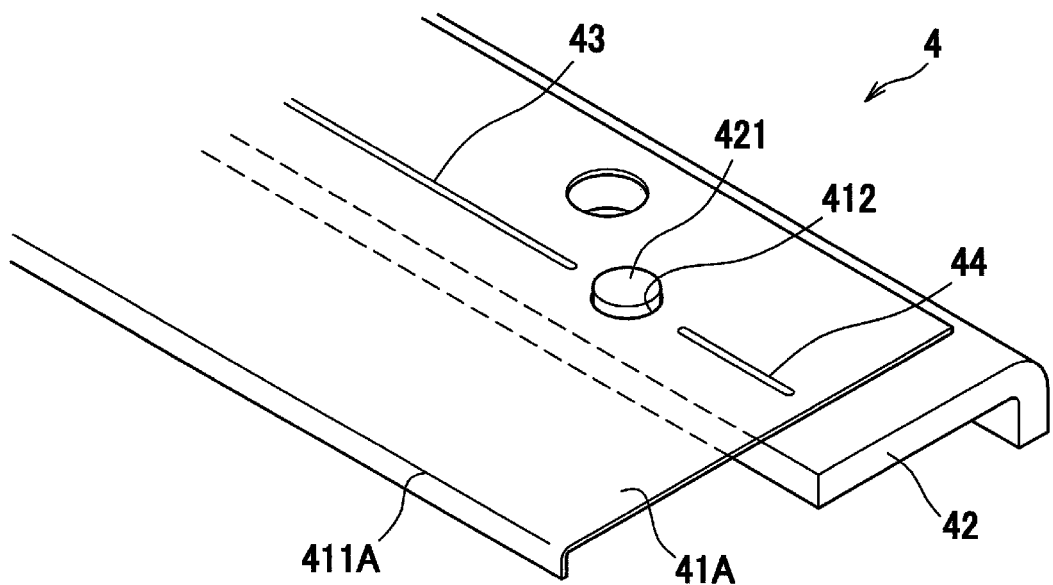
FIG. 13 is a perspective view depicting a blade unit in an eighth variation according to one or more aspects of the disclosure.

As described above, the contact portion 411 may be formed on the blade 41 to protrude from the blade 41. However, the configuration of the blade 41 might not be limited to that example. In other embodiments, for example, as depicted in FIG. 13, the blade 41A might not comprise a contact portion made of, for example, rubber, but may comprise a bent portion 411A in which the distal end portion of the blade 41A may be bent toward the supporting member 42 (e.g., toward a side opposite to the developing roller 2). The bent portion 411A (e.g., the distal end of the blade 41) may directly contact the roller body 2A of the developing roller 2.

Figure 14:
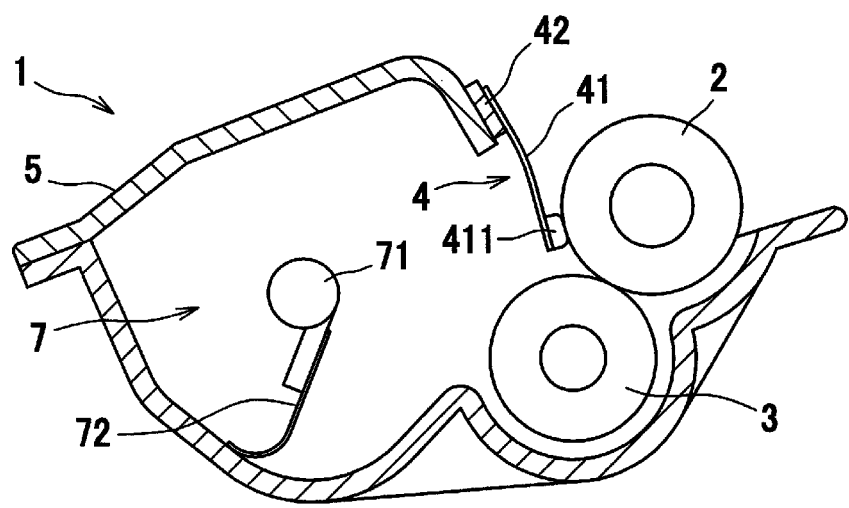
FIG. 14 is a sectional view depicting a developing device in a ninth variation according to one or more aspects of the disclosure.

As described above, the distal end portion of the blade 41 may be placed on the developing roller 2, and the blade 41 may be pinched by the supporting member 42 and the developing case 5. However, the configuration of the blade unit 4 might not be limited to that example. In other embodiments, for example, as depicted in FIG. 14, the supporting member 42 to which the blade 41 may be welded may be fixed to the developing case 5 directly while the supporting member 42 is pinched by the blade 41 and the developing case 5. In the blade unit 4, the distal end portion of the blade 41 (e.g., the contact portion 411) may contact the developing roller 2 from the conveyor member 7 side, and the surface, which may be opposite to the surface 41F having the contact portion 411 thereon, of the blade 41 may be supported by the supporting member 42.

As described above, the developing roller 2 comprising the roller body 2A and the shaft 2B are illustrated as the developer carrier. However, in other embodiments, the developer carrier might not be limited to that example. In other embodiments, for example, a brush roller, a developing sleeve, or a belt-shaped developer carrier may be adopted as the developer carrier.

As described above, the contact portion 411 (e.g., the distal end) of the blade 41 may be in direct contact with the roller body 2A of the developing roller 2 (as an example of the developer carrier). However, the configuration of the blade might not be limited to that example. In other embodiments, for example, the blade may be disposed such that its distal end portion may be substantially 0.1-1.0 mm apart from the roller body 2A.

As described above, stainless steel may be used as the metallic material for the blade 41. However, the material of the blade 41 might not be limited to that example. For example, the blade 41 may be made of, for example, steel used for springs, phosphor bronze, beryllium copper, or carbon tool steel. In a case where the steel used for springs or the carbon tool steel is used, a nickel, chromium, or zinc coating may be applied to the blade 41 to prevent or reduce rust.

As described above, the electrolytic zinc-coated carbon steel sheet may be used as the metallic material for the supporting member 42. However, the configuration of the supporting member 42 might not be limited to that example. In other embodiments, for example, the supporting member 42 may be made of a cold rolled steel plate or a tin plate, or a plate made of one of the cold rolled steel plate and the tin plate whose surface may be applied with treatment such as Parkerizing, chromating, or nickel coating. The supporting member 42 may also have a coating including press oil thereon.

What is claimed is:

1. An apparatus, comprising:
   a developer carrier configured to carry developer thereon and having a rotation axis;
   a blade disposed adjacent to the developer carrier and configured to regulate an amount of developer on the developer carrier; and
   a supporting member configured to support the blade,
   wherein the blade comprises a plurality of weld marks which are arranged in a direction parallel to the rotation axis of the developer carrier and join the blade to the supporting member,
   wherein an edge of at least one of the plurality of weld marks intersects an edge of an adjacent one of the plurality of weld marks, and
   wherein the plurality of weld marks form a combined weld mark that has a dimension of 0.1 to 250 mm in an alignment direction that the plurality of weld marks are aligned, and a dimension of 0.1 to 6.0 mm in a direction perpendicular to the alignment direction.

2. The apparatus according to claim 1, wherein at least one of the plurality of weld marks has a circular shape.

3. The apparatus according to claim 1,
   wherein a direction of a longest dimension of the blade is approximately parallel to a direction of a longest dimension of the combined weld mark.

4. The apparatus according to claim 1,
   wherein a direction of a longest dimension of the blade is approximately perpendicular to a direction of a longest dimension of the combined weld mark.

5. The apparatus according to claim 1, wherein the weld marks are aligned in a direction approximately parallel to a direction of a longest dimension of the blade.

6. The apparatus according to claim 1, wherein the weld marks are aligned in a direction approximately perpendicular to a direction of a longest dimension of the blade.

7. The apparatus according to claim 1, wherein, for a particular weld mark of the plurality of weld marks, a total area of overlapping regions where the particular weld mark overlaps other weld marks is smaller than an area of a non-overlapping region where the particular weld mark does not overlap the other weld marks.

8. The apparatus according to claim 1, wherein, for a particular weld mark of the plurality of weld marks, a total area of overlapping regions where the particular weld mark overlaps other weld marks is greater than an area of a non-overlapping region where the particular weld mark does not overlap the other weld marks.

9. The apparatus according to claim 1, wherein the supporting member and the blade are welded to each other by a fiber laser.

10. The apparatus according to claim 1, wherein the supporting member and the blade are welded to each other by a YAG laser.

11. The apparatus according to claim 1, wherein the blade has a thickness of 0.05 to 2.5 mm.

12. The apparatus according to claim 1, wherein
    the supporting member comprises metallic material, and
    the blade comprises metallic material.

13. The apparatus of claim 1, wherein the supporting member comprises protrusions that protrude into respective openings within the blade, wherein at least one of the openings comprises an elongated opening.

14. An apparatus, comprising:
    a developer carrier configured to carry developer thereon and having a rotation axis;
    a blade disposed adjacent to the developer carrier and configured to regulate an amount of developer on the developer carrier; and
    a supporting member configured to support the blade,
    wherein the blade comprises a plurality of weld marks which are arranged along the rotation axis of the developer carrier and join the blade to the supporting member,
    wherein an edge of at least one of the plurality of weld marks intersects an edge of an adjacent one of the plurality of weld marks, and
    wherein the plurality of weld marks form a combined weld mark that has a dimension of 0.1 to 250 mm in an alignment direction that the plurality of weld marks are aligned, and a dimension of 0.1 to 6.0 mm in a direction perpendicular to the alignment direction.

15. The apparatus according to claim 14,
    wherein a direction of a longest dimension of the blade is approximately parallel to a direction of a longest dimension of the combined weld mark.

16. The apparatus according to claim 14, wherein the weld marks are aligned in a direction approximately parallel to a direction of a longest dimension of the blade.

17. The apparatus according to claim 14, wherein the supporting member comprises protrusions that protrude into respective openings within the blade.

18. The apparatus according to claim 17, wherein the plurality of weld marks are located between the protrusions.

19. The apparatus according to claim 18, wherein the plurality of weld marks are aligned with the protrusions.

20. The apparatus according to claim 18, wherein a particular opening, among the openings, is elongated in a direction parallel to the rotation axis.

21. The apparatus according to claim 20, wherein there is a gap between the particular opening and a particular protrusion, among the protrusions, protruding into the particular opening to absorb expansion of the blade as a result of welding.

* * * * *